May 14, 1929.  J. AVIRGAN  1,712,487
REFRESHMENT BOOTH
Filed Sept. 30, 1926   2 Sheets-Sheet 1
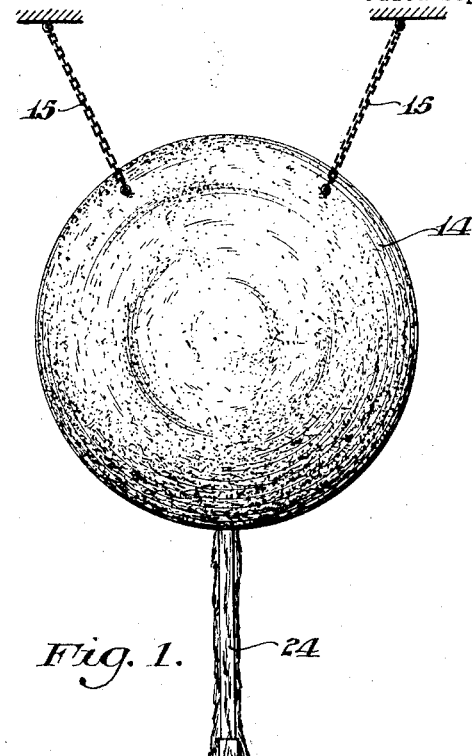
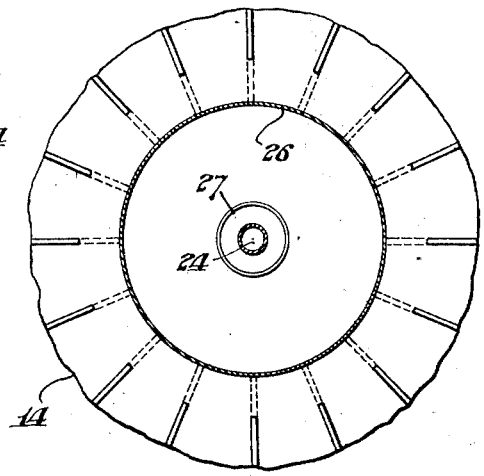
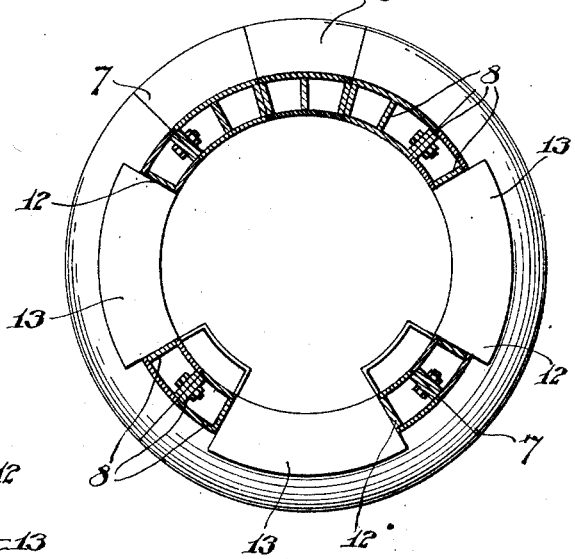
Inventor:
Joseph Avirgan,
By Jas. C. Wobensmith
Attorney.

May 14, 1929.  J. AVIRGAN  1,712,487
REFRESHMENT BOOTH
Filed Sept. 30, 1926  2 Sheets-Sheet 2
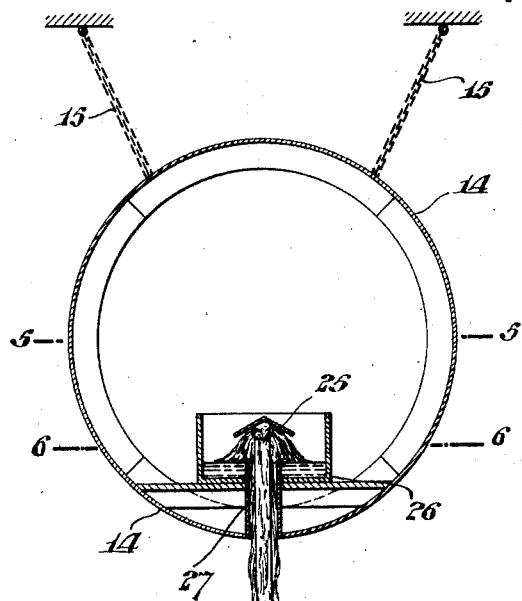
Fig. 2.
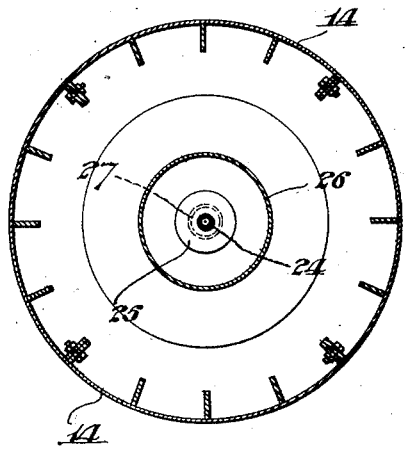
Fig. 5.
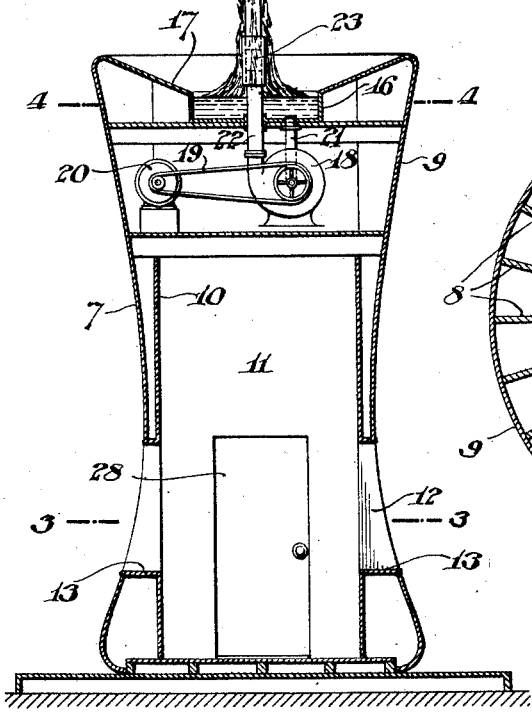
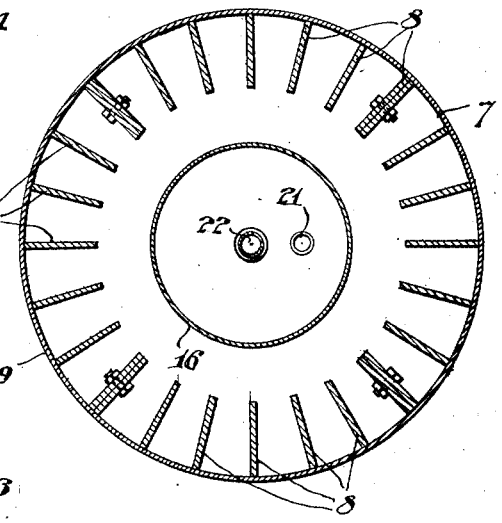
Fig. 4.
Inventor:
Joseph Avirgan,
By Jas. C. Wobensmith
Attorney.

Patented May 14, 1929.

1,712,487

UNITED STATES PATENT OFFICE.

JOSEPH AVIRGAN, OF PHILADELPHIA, PENNSYLVANIA, ASSIGNOR OF ONE-THIRD TO SAMUEL J. T. STOUT AND ONE-THIRD TO SAMUEL AVIRGAN, BOTH OF PHILADELPHIA, PENNSYLVANIA.

REFRESHMENT BOOTH.

Application filed September 30, 1926. Serial No. 138,643.

My invention relates to refreshment booths, and it has particular relation to a booth which is especially adapted for dispensing liquid refreshments such as drinks made from fruit juices and the like.

The object of my invention is to provide a refreshment booth of a novel and attractive appearance which is calculated to induce the sale of the commodities vended therefrom.

With the foregoing object in view, my invention contemplates the employment, in connection with a booth structure, of means for creating the illusion of a stream of fruit juice constantly running from a greatly enlarged fruit into a greatly enlarged drinking glass which forms the principal portion of the booth, and from which or in connection with which commodities are adapted to be vended.

The nature and characteristic features of my invention will be more readily understood from the following description, taken in connection with the accompanying drawings forming part hereof, in which:

Figure 1 is a front elevation of a refreshment booth embodying the main features of my present invention;

Fig. 2 is a vertical central section thereof;

Fig. 3 is a horizontal section, slightly enlarged, taken on the line 3—3 of Fig. 2;

Fig. 4 is a similar section, taken on the line 4—4 of Fig. 2;

Fig. 5 is a horizontal section taken on the line 5—5 of Fig. 2; and

Fig. 6 is a horizontal section enlarged, taken on the line 6—6 of Fig. 2.

Referring to the drawings, in the particular embodiment of my invention therein shown, the main portion of the booth comprises a building structure 7, the exterior of which is shaped to simulate a greatly enlarged drinking glass, preferably of the same shape as those used for dispensing the liquid refreshments for the sale of which the booth is primarily adapted.

The structure is preferably built with vertical ribs 8, the outer contours of which are shaped to the profile of the drinking glass. Over the ribs 8 there is formed, in any preferred manner, an outer shell 9, which may be made of burlap or canvas, and which is suitably painted the color of the liquid refreshments vended from the booth. The inner edges of the ribs 8 are preferably straight and vertically arranged, and on the lower part of the inner edges of the ribs 8 there is mounted a curved shell 10, which may be made of flexible wall board and which forms a smooth inner lining, the arrangement being such as to provide a cylindrical internal chamber 11 for the accommodation of the attendants.

Window openings 12 are provided in the walls of the lower portion of the structure simulating the drinking glass, and through these window openings the refreshments may be dispensed. Counters 13, at the bottom of the window openings 12, are provided for the convenience of the patrons and attendants in the handling of the commodity.

Another structure 14 is arranged some distance above the structure 7, this structure 14 being so shaped and painted as to simulate a natural fruit, but of greatly enlarged size. The same is preferably suspended from any suitable superstructure by means of chains 15, although other means for supporting the fruit simulating structure may be employed if desired.

In an embodiment of this invention which has heretofore been built, the fruit simulating structure 14 is suspended by means of chains from the roof trusses of the main exposition building in which the booth is arranged, although it will, of course, be understood that where the structure is arranged outdoors, a special superstructure for supporting the fruit simulating structure would have to be used.

In the drawings, the structure 14 is shown as constituting the simulation of an enlarged orange, although it will, of course, be understood that other kinds of fruit may be represented if desired. For example, in dispensing pineapple juice and the like, an enlarged representation of a pineapple may be used; in dispensing lemonade, an enlarged representation of a lemon may be used; in dispensing cider or the like, an enlarged representation of an apple may be used; and likewise with various other fruits.

Suitably supported in the upper portion of the structure for simulating the drinking glass is a tank 16, having a flaring lip portion 17 extending from the upper marginal edge thereof to the upper marginal edge of the side wall of the structure. Arranged and suitably supported below the tank 16 is a centrifugal pump 18, which may be driven by a belt 19 extending from an electric motor 20. The inlet pipe 21 of the centrifugal pump extends from the bottom of the tank 16.

The discharge pipe 22 of the centrifugal pump extends upward through the central portion of the tank 16, and the same is connected above the tank 16 by means of a flexible hose 23 to a vertical tube 24, preferably made of glass, which extends upward from the top of the structure simulating the drinking glass to the interior of the fruit simulating structure. The upper end of the tube 24 is provided with a canopy 25, which serves to direct the flow of the liquid pumped through the tube 24 into a tank 26, which is mounted and concealed in the interior of the fruit simulating structure 14.

The central portion of the tank 26 is provided with an outlet tube 27, the interior diameter of which is slightly larger than the exterior diameter of the tube 24. The tube 24 extends through the tube 27, and the arrangement is such that the liquid which is pumped through the tube 24 into the tank 26 will be directed downward on all sides of the tube 24, thereby to simulate a constantly descending stream.

The liquid which passes down on the outside of the tube 24 will be collected in the tank 26 which is provided at the top of the drinking glass simulating structure, whence the same will be pumped upward and thereby continuously circulated by the centrifugal pump 18. The liquid which is thus circulated upward through the interior of the tube 24, and downward on the outside thereof, is preferably colored in simulation of the particular drink which is dispensed by the attendants over the counters provided at the window openings 12.

Both the structure 7 which simulates the drinking glass, and the structure 14 which simulates the fruit, are preferably made in separable sections, so that the same may be readily dismantled and moved from place to place when desired. If desired, a door 28 may be provided in the rear of the structure for the attendants to enter and leave.

It will, of course, be understood that various modifications of the arrangement may be made without departing from the spirit of my invention. For example, the window openings 12 may be omitted if desired, and the dispensing counters may be arranged around the structure simulating the drinking glass, or otherwise associated therewith.

It will be seen that there is thus provided a novel and attractive form of refreshment booth which is adapted to attract the attention of the passersby and thereby stimulate the sale of the commodity dispensed therefrom.

Having thus described the nature and characteristic features of my invention, what I claim as new and desire to secure by Letters Patent, is:

1. A booth for dispensing liquid refreshments comprising a structure simulating an enlarged drinking glass, said structure having an internal chamber for the accommodation of the attendants, the walls of said structure having window openings through which the refreshments may be dispensed, another structure simulating an enlarged fruit, arranged above the first mentioned structure in apparent separated relationship, a tube extending from the one structure to the other and through the interior of which the liquid simulating fruit juice is adapted to be forced upwardly and over the exterior of which said liquid is adapted to descend, the structure simulating the drinking glass having a chamber in the upper portion thereof, and means located in said chamber adapted to circulate the liquid.

2. Display apparatus comprising two objects arranged one above the other in apparent separated relationship, a tube through the interior of which a liquid is adapted to be forced upwardly and over the exterior of which the liquid is adapted to descend, said tube extending from one object to the other, a tank concealed in the upper object adapted to receive the liquid which is forced upwardly through the tube, an outlet from said tank comprising a pipe of slightly larger interior diameter than the exterior diameter of the aforesaid tube and concentrically arranged with respect thereto whereby the liquid discharged from the upper end of the tube will be directed downwardly on all sides of the tube, a tank concealed in the lower object adapted to receive the liquid flowing downwardly over the exterior of the tube, and a pump adapted to force the liquid from said tank through the tube.

3. Display apparatus comprising two objects arranged one above the other in apparent separated relationship, a tube through the interior of which a liquid is adapted to be forced upwardly and over the exterior of which the liquid is adapted to descend, said tube extending from one object to the other, a tank concealed in the upper object adapted to receive the liquid which is forced upwardly through the tube, an outlet from said tank comprising a pipe of slightly larger interior diameter than the exterior diameter of the aforesaid tube and concentrically arranged with respect thereto whereby the liquid discharged from the upper end of the tube will be directed downwardly on all sides of the tube, the aforesaid pipe being entirely contained within the upper object, a tank concealed in the lower object adapted to receive the liquid flowing downwardly over the exterior of the tube, and a pump adapted to force the liquid from said tank through the tube.

In testimony whereof, I have hereunto signed my name.

JOSEPH AVIRGAN.